July 14, 1942.  A. D. BRANHAM  2,289,750
PASSENGER MILEAGE RECORDER
Filed Sept. 17, 1936  3 Sheets—Sheet 1

| 220–0 0 0 0 0 | ≡ 0 0 0–221 | 222–APR 20 1936 8:09 AM |
| 223–0 0 0 0 0 | ≡ 0 1 4–224 | 225–APR 20 1936 8:15 AM |
| 226–0 0 0 2 0 | ≡ 0 1 4–227 | 228–APR 20 1936 8:45 AM |
| 229–0 0 0 2 0 | ≡ 0 2 6–230 | 231–APR 20 1936 8:50 AM |
| 232–0 0 0 4 2 | ≡ 0 2 6–233 | 234–APR 20 1936 9:30 AM |

INVENTOR.
ADOLPHUS D. BRANHAM,
BY Lawrence C. Kingsland
ATTORNEY.

July 14, 1942.  A. D. BRANHAM  2,289,750
PASSENGER MILEAGE RECORDER
Filed Sept. 17, 1936  3 Sheets-Sheet 2
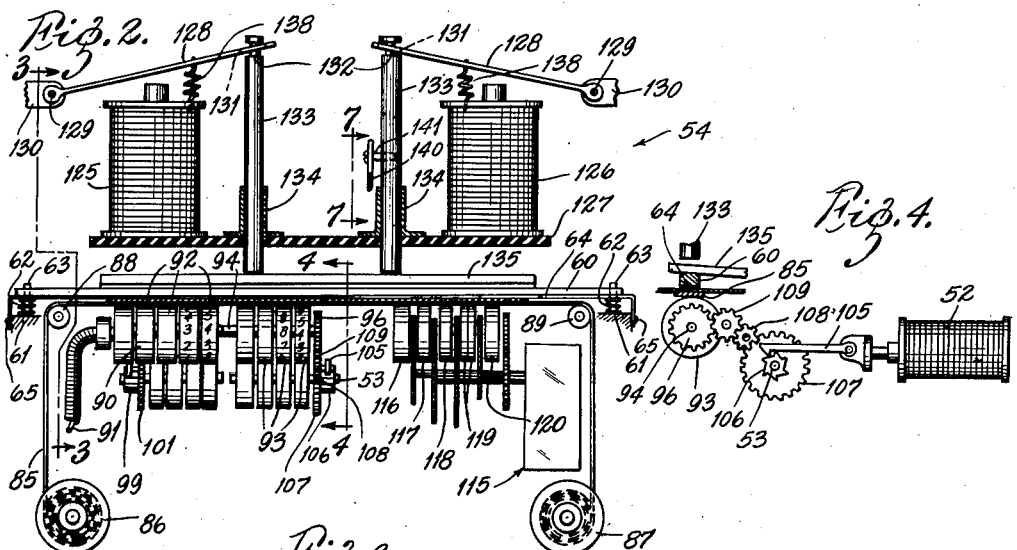
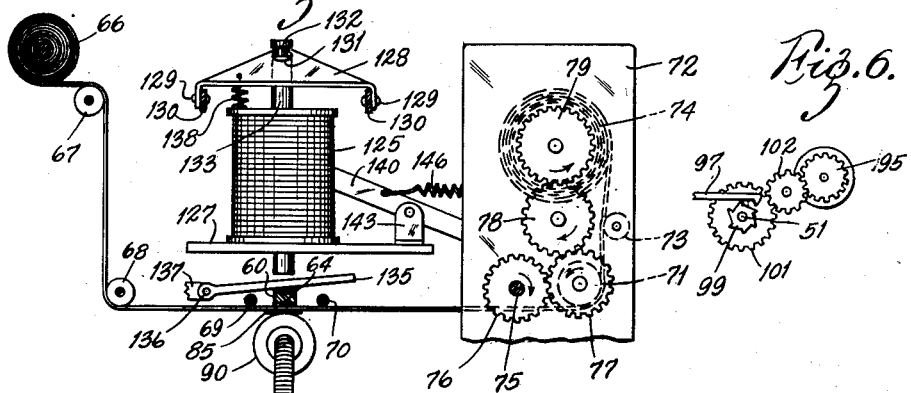
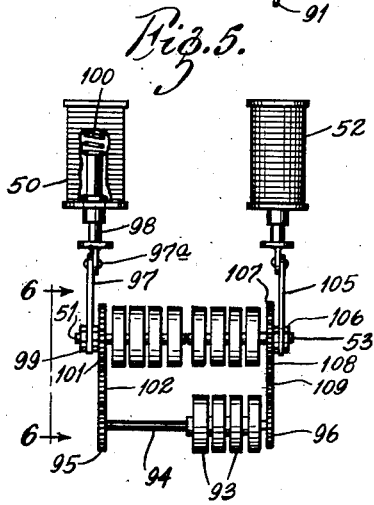
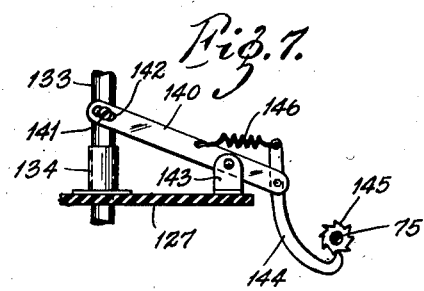
INVENTOR:
ADOLPHUS D. BRANHAM,
BY Lawrence C. Kingland
ATTORNEY July 14, 1942.   A. D. BRANHAM   2,289,750
PASSENGER MILEAGE RECORDER
Filed Sept. 17, 1936     3 Sheets-Sheet 3
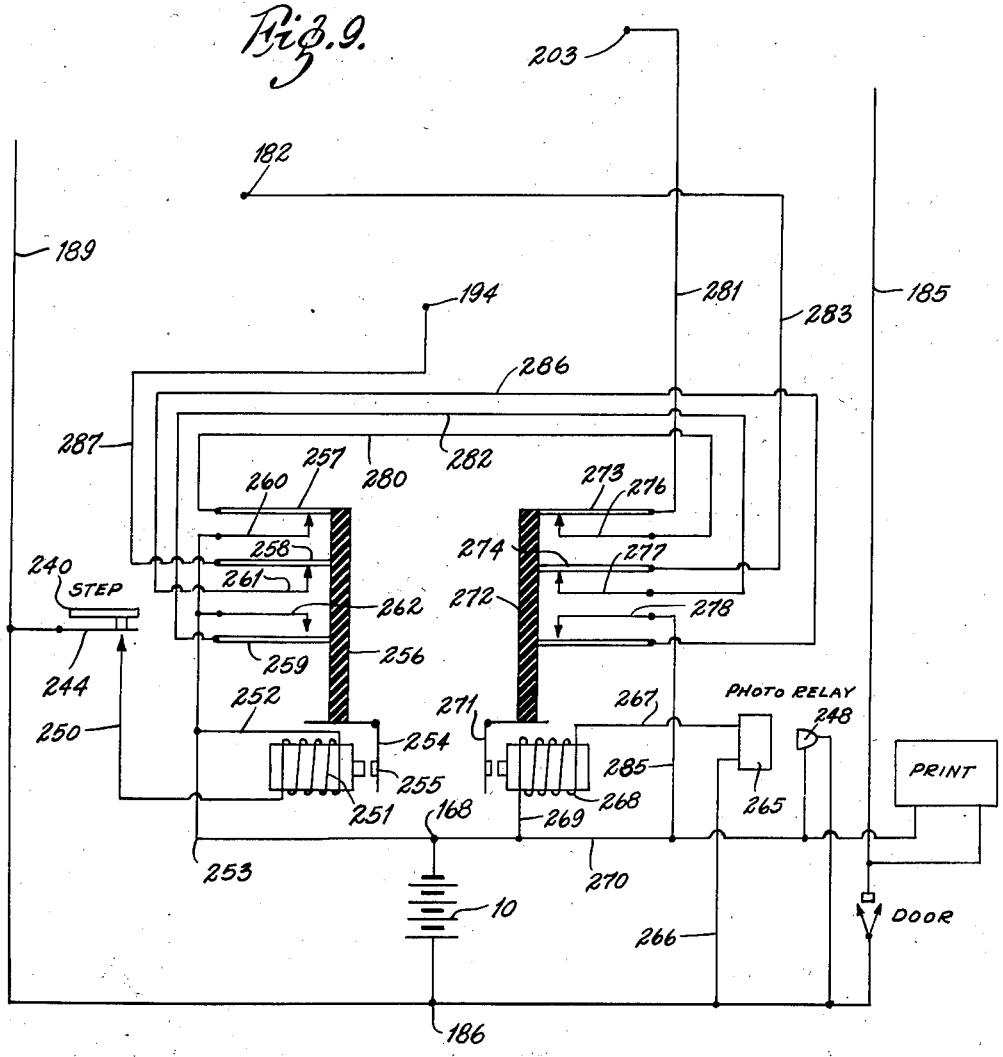
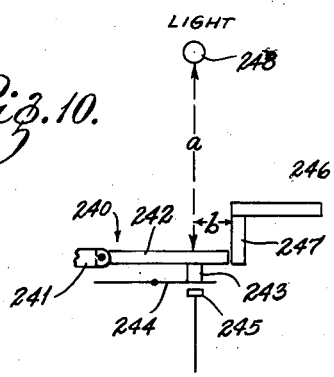
INVENTOR:
ADOLPHUS D. BRANHAM,
BY Lawrence C. Kingsland
ATTORNEY.

Patented July 14, 1942

2,289,750

UNITED STATES PATENT OFFICE 2,289,750

PASSENGER MILEAGE RECORDER

Adolphus D. Branham, St. Louis, Mo.

Application September 17, 1936, Serial No. 101,200

13 Claims. (Cl. 234—12.5)

The present invention relates to mechanisms for determining and recording the number of passenger miles traveled by a vehicle, together with other certain data pertinent thereto. That is to say, it records the number of passengers on the vehicle between any two given points, together with the mileage of the respective points away from a given index or starting point; time and date data.

Hitherto in apparatuses of this kind, indications or recordations have been given of the number of passengers that board the vehicle and the number of passengers that leave the same.

It is an object of the present invention to provide a mechanism that will record the net number of passengers on the vehicle at any time.

It is a further object of the invention to provide a mechanism that at the same time will record the mileage of the several points at which indications are made.

It is a further object of the invention to provide a mechanism that will at the same time record the time and date of the records.

It is a further object of the invention to provide specific means actuating a counter to add on each individual passenger boarding the vehicle and means to subtract off the same register each individual passenger leaving the vehicle.

It is a further object of the invention to provide means to negative the effect of a passenger's partially boarding the vehicle and then leaving the same.

It is a further object of the invention to provide means for operating the printing means of the recording device each time the door is opened or closed.

A further object of the invention is to provide a two-stage control for operating counting mechanisms, one stage including a step-operated switch, and the other stage including a light-operated switch.

A further object of the invention is to provide a light beam-actuated switch so located relative to a step-operated switch as to be operated either previously to or subsequently to the operation of the step-operated switch.

A further object is to provide a mechanism of this kind having two-switch operation so designed as to avoid inaccuracies because of crowding.

This application is a continuation in part of my co-pending application Serial No. 689,944, filed September 18, 1933.

Referring to the drawings:

Fig. 2 is a fragmental view showing the printing mechanism.

Fig. 3 is a view on the line 3—3 of Fig. 2.

Fig. 4 is a section on the line 4—4 of Fig. 2.

Fig. 5 is a fragmental view of the counter mechanism.

Fig. 6 is a section on the line 6—6 of Fig. 5.

Fig. 7 is a section on the line 7—7 of Fig. 2, showing the paper-shifting mechanism.

Fig. 9 is a wiring diagram showing certain modifications over that shown in Fig. 1 including substitution of a photoelectric relay for one stage.

Fig. 10 is a diagrammatical view showing the arrangement of the light relative to the step.

Figures 1, 8:
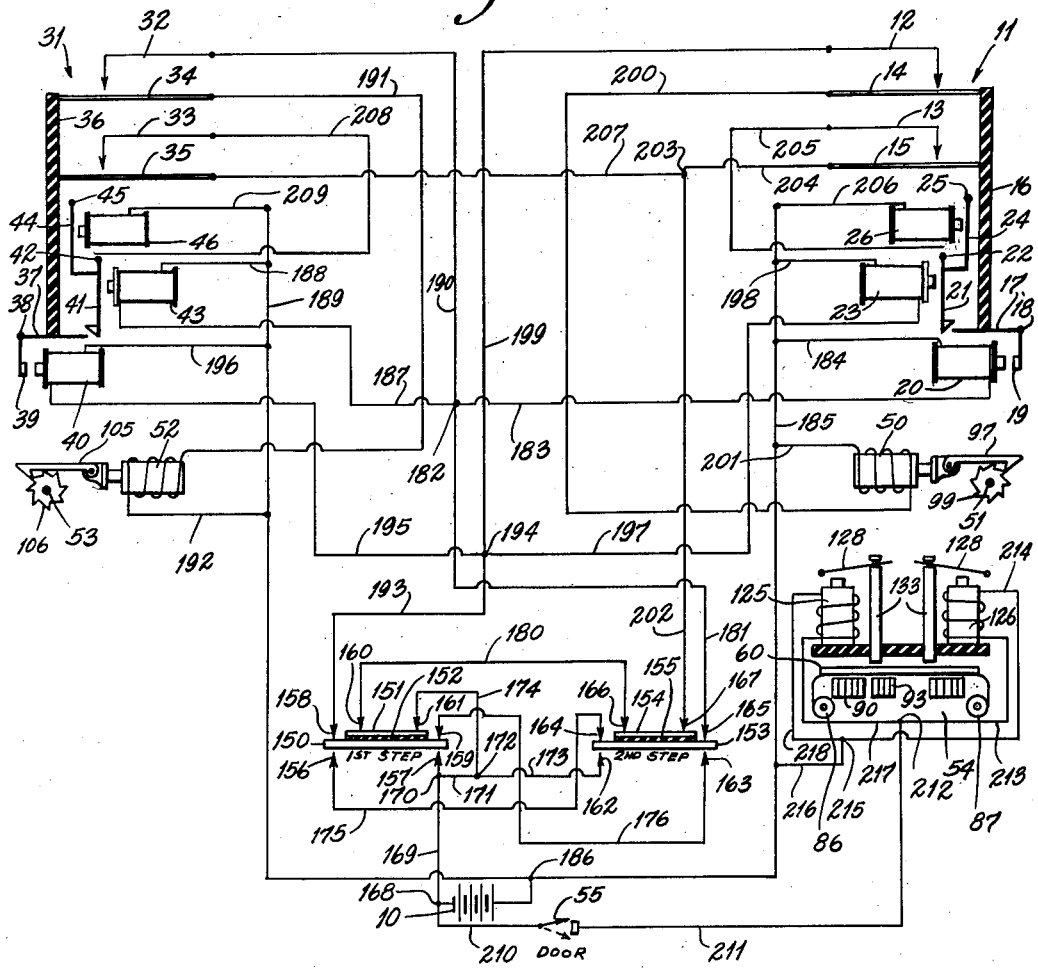
Fig. 1 is a diagrammatical view of the device showing the circuit thereof.
Fig. 8 is a view of a record made by the machine.

Broadly, the device includes a counter calculating the number of persons boarding the vehicle and an odometer determining the miles traveled; a date and time mechanism, all of the three mechanisms having printing means thereon; a platen; a paper supply; and means for actuating these several mechanisms in synchronism.

Referring to Fig. 1, a battery is provided at 10 from which power is obtained to actuate the several mechanisms. These mechanisms are put into circuit in the proper order by operation of the two steps of the vehicle that are shown in Fig. 1. It will be understood that the steps are operable to two positions, in each of which they close certain circuits in the manner well known in the art. The circuit is divided generally into two phases: The first of these is the "on" phase operated as a passenger ascends the steps to board the vehicle; the second is the "off" phase operated as a passenger descends the steps to leave the vehicle. Each phase includes a locking switch together with a slow-acting operating release therefor and a fast-acting trip. The locking switches are likewise controlled by relays and it will be shown that until one or the other of these locking switch relays is energized to close its switch, the counting mechanism cannot operate. Each locking switch ultimately permits its part of the counting mechanism to be actuated. As will be explained in detail hereafter, a control shaft of the passenger counting mechanism is operated in one direction as the passenger boards the vehicle and in the other direction as the passenger leaves the vehicle.

In Fig. 1, therefore, there is an "on" locking or main switch 11 having fixed contacts 12 and 13 with movable contacts 14 and 15 engageable respectively with the fixed contacts. To the movable contacts 14 and 15 is connected a member 16 that rides upon a bell crank 17 pivoted at 18 so that, as this bell crank is rotated in a clockwise direction a slight distance, it will lift the member 16 to close the two movable switch blades against the two fixed switch blades. On the other end of the bell crank 17 is an armature 19. This armature is adapted to be attracted by an "on" locking switch relay 20. When the bell crank 17 is drawn by the relay 20 to close the switch 11, it locks over a locking hanger 21 pivoted at 22 and adapted to be drawn toward a slow-acting relay 23. Furthermore, a trip lever 24 pivoted at 25 is adapted to be drawn to a trip relay 26 upon energization of the latter. Such movement of the trip arm 24 causes it to push the locking arm 21 from beneath the bell crank 17 so that the switch 11 then opens. From the description thus far given, it will be seen that the switch 11 is closed when the relay 20 is energized and may be opened slowly by action of the relay 23 or instantaneously by the relay 26.

On the off side of the mechanism, there is a similar locking or main switch 31 having fixed contacts 32 and 33 with movable contacts 34 and 35. The movable contacts 34 and 35 are joined by a connecting member 36 that rests upon a bell crank 37 pivoted at 38, the other arm of which has an armature 39 attracted toward a locking relay 40. When the bell crank 37 is oscillated by being attracted toward the locking relay 40, it locks under a locking arm 41 pivoted at 42 and which is adapted to be attracted to the slow-acting relay 43. Likewise, a trip arm 44 pivoted at 45 is adapted to be attracted to the trip relay 46. This mechanism operates in exactly the same manner as does the switch 11.

Operated by and in series with the contacts 12 and 14 of the switch 11 is a magnet 50 operating through ratchet mechanism, as shown, the counting shaft 51. This mechanism is to be described in detail hereafter. In series with the contacts 32 and 34 of the switch 31 is the magnet 52 likewise operating ratchet mechanism and the counting shaft 53, as will be described. Suffice it to say at this time that the mechanism 50 operates the counter in one direction and the mechanism 52 in the opposite direction. The printing mechanism 54, likewise to be described in detail hereafter, is controlled by a switch 55 on the vehicle door which switch operates at some intermediate point during the movement of the door as the same is opened or closed.

To show the operation of the printing and counting mechanism, reference may be had to Figs. 2–7 inclusive. In Fig. 2 at 60 is shown a platen maintained in upward position from a base 61 by springs 62 surrounding pins 63. Suspended beneath the platen is a rubber insert 64 secured as by means 65 at each end thereof to the base 61, it being understood that openings are provided so that the pins 63 may pass through the rubber strip. This strip forms a resilient working surface on the platen.

A supply roll of paper 66 is duly supported on the frame of the machine, the frame not being shown since it could take any convenient form. The paper is drawn over idlers 67, 68 and 69 and thence beneath the platen 60 and the rubber strip 64, following which it passes beneath the idler 70, over an idler roll 71 supported on the frame 72, and thence passes by an idler 73 onto the receiving roll 74, these latter two elements being mounted on the frame 72. As will, of course, be understood the frame 72 may comprise two upright members with the rolls mounted therebetween.

A driving shaft 75 is mounted on the frame 72 and outside the frame is provided with a driving gear 76. This gear meshes with the gear 77 mounted on the shaft of the idler roll 71. The gear 77 meshes with the idler gear 78 likewise mounted on the frame 72 that in turn meshes with the gear 79 that is fixed to and turns the shaft of the receiving roll 74. Thus upon actuation of the driving shaft 75, in a manner to be disclosed, the idler roll 71 and the receiving roll 74 are rotated correspondingly.

Beneath the paper and the platen extends a printing ribbon 85 that passes between rolls 86 and 87 by way of two idler rollers 88 and 89. The several recorders now to be described are located directly beneath the ribbon and the platen to print on the paper as the platen is actuated. These recorders include a mileage counter 90, operated from a cable 91, in a manner well known in odometers. This counter 90, therefore, will register the mileage traveled by the vehicle, and comprises the familiar counting rolls 92.

The passenger counting mechanism includes counting rolls 93 that are similar to counting rolls 92, which are actuated by the following mechanism: The rolls 93 are mounted on a shaft 94 in such wise that the unit roller, when it reaches 10, will actuate the tens roll one unit which in turn operates the hundreds roll in like manner, these all being well known in the art. At one end of the shaft 94 is a gear 95 and at the opposite end a gear 96.

For operating the gear 95 to turn the counter shaft in one direction is the previously described counter magnet 50. This counter is connected thereto by ratchet mechanism including a ratchet arm 97 (Figs. 5 and 6) pivoted at 97a to the armature 98 of the magnet 50. Thus, when the magnet is energized, the armature 98 and the ratchet arm 97 are drawn upward as in Fig. 5 or to the left as shown in Fig. 6. The ratchet arm 97 engages the ratchet wheel 99 to turn the same one tooth each time the armature 98 is drawn in. A spring 100 returns the ratchet arm upon deenergization of the magnet 50. The ratchet wheel 99 is secured to the previously described shaft 51 to which also is secured the gear 101. This last named gear meshes with an idler 102 that in turn operates the gear 95. Thus each time that the magnet 50 is energized, the ratchet arm 97, through the medium of gears 101 and 102, rotates the shaft 95 in a direction to add one unit. It will be observed that in the inoperative position the arm 97 extends out sufficiently to permit reverse movement of the ratchet wheel 99.

The count-off magnet 52, previously described, has a ratchet 105 operating a ratchet wheel 106, this structure being in all respects identical with that of the magnet 50. The ratchet wheel 106 is secured to the shaft 53 upon which also is secured a gear 107. In this case, two idlers 108 and 109 are interposed between the gear 107 and the gear 96, whereby movement of the ratchet 106 is reversed onto the shaft 94. Thus, upon energization of the magnet 52, the shaft 94 is rotated in a subtracting direction one unit, these rotations of the shaft 94 being duly transmitted to the counters 93.

Therefore, it will be understood that the counters 93, referring back to Fig. 2, will always indicate the net number of passengers on the vehicle, since, as will be shown, each time a passenger boards a vehicle the magnet 50 will operate to add one unit on the counter 93; whereas each time a person leaves the vehicle, the magnet 52 will operate to subtract one unit from the counter 93.

A dating mechanism is generally indicated at 115. Through suitable take-off mechanism, the device 115 operates a month indicating roll 116, a day indicating roll 117, a year indicating roll 118, hour and minute indicating rolls 119 and an A. M. or P. M. indicating roll 120. It is understood that, through suitable gearing, the various rolls 116—120 are synchronized so that the topmost indications on them will always give the proper month, day, year, hour, minute and A. M. or P. M. indications.

The several indicators described are held immediately beneath the ribbon 85 and may be rotated according to their several operating mechanisms whenever the platen 60 is elevated. This platen is depressed each time the door switch 55 is closed, by the following means: Two coils 125 and 126 are located on a suitable table 127 secured to the support of the device. Since these two mechanisms are identical, only one need be described. Above the coils 125 and 126 is an armature 128 pivoted at 129 to a portion 130 of the support. An opening 131 engages around the neck 132 on each plunger 133. This plunger rides in a bearing 134 on the base 127. Thus upon energization of the coils 125 and 126, the armature 128 is attracted suddenly toward the coils. The armature will force the plungers 133 down until they strike a plate 135 pivoted at 136 to a fixed portion 137 of the support. This pivoted plate 135 will then be forced down carrying the platen 60, the rubber strip 64 and forcing the paper against the ribbon 85 and the several counters. All of the counters have upstanding figures thereon, so that the indications duly registered on them are recorded on the paper. Upon deenergization of the magnets 125 and 126, springs 138 will return the armatures 128 to their elevated positions.

As the plunger 133 comes down, it carries with it a lever 140 pivotally connected to it by a screw 141 engaging in a slot 142. The lever 140 is fulcrumed on an ear 143 secured to the table 127. A ratchet arm 144 is pivoted at the outer end of the lever 140 and engages around a ratchet wheel 145 that is secured to the drive shaft 75 of the paper feeding mechanism. A spring 146, between the arm 144 and the lever 140, forces the ratchet arm 144 into engagement with the tooth of the ratchet wheel 145. Thus each time the plungers 133 are drawn down, this ratchet mechanism will rotate the shaft 75 and ultimately the receiving roll 74 to bring a new section of paper into position for the printing action just as the platen is closed tightly against the paper.

Referring back to the wiring diagram of Fig. 1, the several mechanisms are brought into operation as follows: the first step of the vehicle includes, attached thereto so as to be depressed when a passenger steps upon the step, and to rise as he steps off, a movable switch plate 150. This plate is of conducting material. On top of this plate there is secured a second plate 151 insulated from the first by insulation 152. The second step has a corresponding main switch plate 153 on top of which is a second plate 154 insulated therefrom by insulation 155.

Contacts 156 and 157 are closed when the plate 150 is depressed. When this step is up, however, contacts 158 and 159 are closed through the plate 150 and contacts 160 and 161 are closed through the plate 151.

Similarly, contacts 162 and 163 are closed through the plate 153 when the second step is depressed. When this second step is lifted, contacts 164 and 165 are closed through the plate 153 and contacts 166 and 167 are closed through the upper plate 154.

From the negative terminal 168 of the battery, a line 169 extends to the point 170 to which is connected the terminal 157. Likewise from the point 170 extends the line 171 to the point 172, to which point is connected the terminal 162 of the second step by means of line 173. From the point 172 also extends a line 174 to the terminal 161. Thus the points 157, 161 and 162 are always connected to the negative pole of the battery. From the terminal 156 of the first step extends a line 175 to the upper terminal 164 of the second step. The lower terminal 163 of the second step is connected by a line 176 to the upper terminal 159 of the first step. The upper terminal 160 of the first step is directly connected to the upper terminal 166 of the second step by a line 180.

The upper terminal 165 of the second step is connected by a line 181 to a terminal point 182. From this terminal point extends a line 183 into the coil of the lock relay 20 of the switch 11 from which coil it extends by lead 184 into line 185 to terminal 186 which is the other terminal of the battery 10. Returning to the point 182, a second branch 187 therefrom extends into the coil of the slow relay 43 of switch 31, whence it passes by lead 188 into lead 189 and thence back to the positive terminal 186 of the battery 10. The third branch from terminal 182, designated 190, extends to the blade 32 of the switch 31. If this switch 31 is closed, the lead 190 will then connect through the blade 32, the blade 34 to a line 191, through the coil 52 of the count-off mechanism and thence by lead 192 into lead 189 and to the positive terminal 186 of the battery.

From the upper contact 158 of the first step extends a line 193 to a terminal 194. From this terminal extends a line 195 connected to the coil of the lock relay 40 of the switch 31, from which coil extends the lead 196 connected to the lead 189 and thence the terminal 186 of the battery. Likewise, from the terminal 194 extends a line 197 connected to the coil 23 of the slow-acting relay adapted to open the switch 11, and thence by lead 198 to lead 185 and to the positive terminal 186 to the battery. The third line from terminal 194 is line 199 extending to blade 12 of the switch 11. If the switch 11 is closed, this line will connect through the plate 12, the plate 14, the line 200 through the coil 59 of the count-on mechanism and thence by lead 201 into lead 185 and to the terminal 186 of the battery.

From the upper terminal 167 of the second step switch extends a line 202 to a terminal 203. From this point extends a line 204 to the switch plate 15 of the switch 11. If the switch 11 is closed, the line 204 will connect through the blade 15 and the blade 13 to a line 205 and thence into the trip coil 26 of the switch 11, whence by lead 206, it passes into the lead 185 and to the positive terminal 186 of the battery. Also from the terminal 203 extends a line 207 to the blade 35 of the switch 31. If this switch is closed, the line 207 will connect through the blade 35, the blade 33 to a line 208 to the trip coil 46 whence it passes by lead 209 into the lead 199 and to the terminal 186 of the battery.

The printing coils are operated from a circuit including line 210 extending from the negative terminal 168 of the battery, through the switch 55. It will be observed that this switch is closed intermediate the two extremes in the operation of the door. From this switch extends line 211 that branches at terminal 212 into line 213 through the coil 126, thence by lead 214 to the terminal 215, by lead 216 to the line 185 and to the positive battery connection 186. Likewise from point 212 extends line 217 into coil 125, thence by lead 218 to the point 215, the lead 216, and the lead 185 to the positive terminal 186 of the battery. Thus, everytime the door is moved, either from closed to open position or from open to closed position, the printing mechanism is energized to operate.

The operation of the device as a whole is as follows:

At the outset both steps or operating switches are up, where they are normally maintained by suitable springs. It will be assumed that the lock switches 11 and 31 are both open. Tracing the circuit will show that it is entirely open. It will be remembered that the negative terminal of the battery has three paths into the mechanism. Two of these are from the point 170 to contact 157 and contact 162. Both of these contacts are open. The circuit, however, at this time may be traced from point 168, line 169, terminal 170, line 171, terminal 172, line 174, upper contact 161 through the switch plate 151, contact 160, line 180, upper contact 166 to the second step switch plate 154, contact 167, line 202 to the terminal 203. From this point, the lines 204 and 207 lead into the switches 11 and 32, respectively. Since both of these switches are open, it may be observed that this circuit likewise is open.

At this time, suppose that the door is opened shifting the switch 55 so that it closes for a brief period during the act of opening the door. The printing mechanism will then be actuated by the following circuit: negative pole 168 of the battery, line 210, switch 55, line 211, terminal 212, whence it divides by lines 213 and 217, respectively, into the coils 126 and 125 from which coils it returns by leads 214 and 218, respectively, to terminal 215, thence by lead 216 and lead 185 to positive battery terminal 186. Since at this time there are no passengers aboard the vehicle and, since it may be assumed that it has traveled no distance, the mileage indication 220 is Fig. 8 and the passenger indication 221 in Fig. 8 will be zero. However, the date and time mechanism, being independently actuated, will indicate as shown at 222 in Fig. 8.

At this time, suppose a passenger boards the vehicle. This first causes depression of the first step, the second step remaining up. Depression of this step opens the circuit previously traced from the terminal 170 to contact 161, but closes a circuit as follows: from the negative pole 168 of battery through line 169, terminal 170, contact 157, lower plate 150 of the first step switch, contact 156, line 175, upper contact 164 of the second step, plate 153 of the second step switch, contact 165, line 181 to the terminal 182. From this terminal, it will extend by line 183 through the coil 20, back lead 184 to lead 185 and to the positive terminal 186 of the battery. The closing of the circuit through the coil 20 draws the armature 19 of the bell crank 17 toward the coil, lifting the connecting member 16 of the switch 11 to close the same. It will immediately lock over the retaining member 21 and will be held in closed position. Returning to the terminal 182, there also leads from this point the line 190 to contact 32 of the switch 31. This switch, however, is open so that the circuit is not completed. Also from the terminal 182 extends the line 187 through the slow release coil 43 of switch 31 and by lead 188 to lead 189 to positive pole 186 of the battery. However, since it was initially assumed that the switch 31 was open, this action has no effect on the mechanism. Thus it may be seen that stepping onto the first step, without depressing the second step, closes the locking switch 11.

If at this time the passenger should change his mind and leave the vehicle, releasing the first step to up position, without getting onto the second step, the following action takes place. As has previously been described, with both steps up the circuit is closed from point 168, terminal 170, terminal 172 to the top plate of both the switches in the upper position to the terminal 203. Since the branch 207 leads to the open switch nothing happens from it. However, the branch 204, leading from terminal 203, goes to movable contact 15 of the switch 11. Since, in the previous action of stepping onto the first step, the switch 11 was closed, the switch blade 15 will be closed with the switch blade 13 so that the circuit will be closed through this latter blade, line 205, trip coil 26, lead 206, and lead 185 to the positive terminal 186 of the battery. Energization of the trip coil 26 draws the trip lever 24 toward the coil to force the locking member 21 from beneath bell crank 17 so that the switch 11 opens by the resiliency of the blades 14 and 15. Thus the machine is cleared and returned to its starting position. The purpose for clearing the machine will be evident from the discussion to follow.

Returning, however, to the condition wherein the passenger ascended the first step, closing the switch 11, let it be assumed that he then proceeds to depress the second step and then free the first step. At this point, it may be noted, should he step onto both steps at once, nothing will happen, since the circuit will be open as can readily be determined. With the second step down and the first step up, the circuits are closed as follows: negative terminal 168 of the battery, line 169, terminal 170, line 171, terminal 172, line 173, lower contact 162 of the second step plate 153, contact 163, line 176, upper contact 159 of the first step plate 150, contact 158, line 193 to the terminal 194. From this point, the circuit can proceed through line 195, through coil 40 to lock switch 31 closed, thence through lead 196 and lead 189 to the positive pole 186 of the battery. Returning to the point 194, the circuit likewise can proceed through line 197, through the slow coil 23, lead 198, and lead 185 to the positive terminal 186 of the battery. The coil 23 then, after a short delay, will withdraw the locking member 21 from the bell crank 17 and permit the switch 11 to open. Before this coil opens the switch, however, the circuit may also pass from the point 194, through line 199 to blade 12 of switch 11, through blade 14, line 200, through counting coil 50 to operate the counting mechanism one unit in the adding direction, lead 201 and lead 185 to the positive battery terminal 186.

Therefore, it will be seen that stepping onto the second step and off of the first step counts the passenger on and locks the switch 31 closed; and after a short period opens the switch 11 by means of the coil 23. Of course, it will be understood that the coil 23 operates very promptly, since the time necessary to actuate the counter is very small.

If at this time the passenger then changes his mind and does not board the vehicle but steps from the second step to the first step, freeing the second step, the circuit will again be closed as previously described to the point 182, the point 194 being open since it derives energization through the contact 158 which in turn is open. At this point, it will be remembered that the switch 11 is open and the switch 31 closed. From the point 182, the circuit is closed, as previously described, through line 183 to energize the lock-on coil 20 and reclose the switch 11. Neither of the circuits of the switch 11 is closed, so nothing happens from this action. However, from the point 182, the circuit is also closed through line 187 to slow-acting off coil 43, lead 188 and lead 189 to the positive terminal 186. Before this coil 43 is affected to open the switch 31, however, the circuit is closed from point 182 to line 190, switch blade 32, switch blade 34, line 191 through the count-off coil 52, lead 192 and lead 189 to the positive pole 186 of the battery. Energization of the coil 52 operates the counting mechanism in a subtracting direction to count off the passenger. Then, as he steps off of the first step lifting both steps up, the mechanism will be cleared by the circuit from the pole 168, line 169, terminal 170, line 171, terminal 172, line 174, and then, as previously described, to the point 203. From this point, the circuit divides through line 207 to blade 35, where it is broken because the coil 43 has already released the switch 31. However, from point 203, it may proceed through line 204, blade 15 and blade 13, since switch 11 was closed, line 205, through trip coil 26 freeing the switch 11, lead 206, and lead 185 to the positive terminal. It will be observed that whenever both steps are up, the point 203 is put in circuit and, if either switch 11 or switch 31 is closed, its respective trip coil will be energized to open it immediately. Consequently, the mechanism is cleared whenever both steps are freed.

Returning to the condition wherein the passenger stepped off of the first step and onto the second step, it will be remembered that the count-on 50 has been energized and the passenger has been counted on. If he then steps into the vehicle and frees the second step, so that it and the first step are up, the mechanism will be immediately cleared, since the point 203 is put in circuit. With the conditions just described, the trip 46 will be energized to open the switch 31, since upon depression of the second step to the first step off, the lock-off coil 40 was put in circuit. Of course, as each successive passenger boards the vehicle, the count-on coil 50 will be energized and the counter 93 advanced one unit.

Should a passenger leave the vehicle, he will first step on the second step, the first step remaining up. This will put point 194 in circuit in the manner previously described. From this point, the circuit may pass through line 195, the coil 40, to close switch 31, lead 196 and lead 189 to positive side 186 of the battery. Thus this action closes the switch 31. At the same time, by line 197 the operating coil 123 will be energized but will have no effect since the switch 11 is already open, likewise the circuit through line 199 will break at the switch 11. If the passenger then steps off the second step and onto the first step, point 194 will be taken out of circuit and point 182 put in circuit, as previously described. From this point, the circuit may close through line 183 to energize the lock-on coil 20 to close the switch 11, as previously described. It will, likewise, close through line 187 to energize the slow-acting coil 43, as previously described, which will after delay open the switch 31. Prior to completion of the action of the coil 43, the circuit will also close from point 182, through line 190, blade 32, blade 34, line 191, count-off coil 52, lead 192 and lead 189 to positive terminal 186. Energization of the coil 52 operates the counter 93 in a subtracting direction for each passenger leaving the vehicle. If this passenger then steps off the first step, leaving both steps clear, point 203 will be put in circuit and the circuit will be completed through the trip coil 26 to open the switch 11.

If the passenger starts to leave the vehicle, stepping on the second step, but then changes his mind and releases this step without depressing the first step the operation will be the previously described one of first closing the switch 31, and then opening the same after the second step is released, since such release puts the point 203 in circuit and, therefore, this circuit may be closed through the trip coil 46 of the switch 31. If the passenger steps onto the second step and then to the first step, it will be remembered that the count-off mechanism is operated. If, however, without leaving the vehicle, he then returns to the second step, the following action will take place: having stepped on the first step, the count-off mechanism was operated, the slow-release coil 43 opened the switch 31 after a delay, and the lock-on coil 20 closed the switch 11. Upon returning to the second step, releasing the first step, the point 194 is again put in circuit and point 182 taken out of circuit. As previously described, putting point 194 in circuit, by means of line 195, energizes the lock-off coil 40 and closes the switch 31. It likewise, through line 197, energizes the slow-release coil 23 to open the switch 11 after a delay. It further, through line 199 and before the switch 11 opens, operates the count-on coil 50 to count the passenger back on. Then, as soon as he releases the second step, so that both the first and the second are free, the switch 31 will be opened by energization of its trip coil 46 from the point 203.

Thus it may be seen that the "on" side and the "off" side of the circuit are identical in substance, but the reverse in order of operation. By providing closing of the lock switches as the first operation, then, if the passenger gets off, without completing the operation, the lock switches may be freed and the mechanism cleared. If these lock switches are not cleared, the following action of the "on" circuit might take place or its counterpart in the "off" circuit. Suppose that the passenger boarded the first step and energized the lock switch 11. If this switch were not cleared, when he stepped off the vehicle without completing the operation and a passenger already on the vehicle were to get off, his first action would be to depress the second step. With the lock switch 11 closed, stepping on the second step is the second stage in operation of the "on" mechanism, so that the passenger leaving the vehicle would complete the "on" circuit and count himself on a second time, so that his subsequent action in stepping onto the second step to operate the count-off mechanism would act merely as a cancellation and there would be no recordation of his leaving the vehicle. Thus, the counting circuits are dependent upon the depression of the first step in either direction, the subsequent release of that step and depression of the second step immediately thereafter. Or, referring to the circuit diagram, the point 182 and 194 control the counting coils. And, with one step depressed, circuit to one of these points is closed only when the other step is open. The provision that, when the second step in either direction is depressed, actuating the counting mechanism of one phase, the locking switch of the other phase is energized to close its switch, permits the operation of negativing the effect of such counting mechanism if the passenger does not complete the operation, but rather steps back onto the first step, since it prepares the other phase for operation of its counting mechanism when the step back takes place.

Referring again to Fig. 8, the first row of indications shows the conditions as the vehicle starts out with no passenger aboard and with the door open. Prior to the time the vehicle leaves, a number of persons board the same, each of them having operated the count-on mechanism. A certain number of persons may also have left the vehicle as it stood and will have been counted off; hence, when the door switch 55 is again actuated as the door is closed prior to the vehicle's getting into motion, there will be a net indication on the counter 93. This net indication will be the number of persons actually aboard the vehicle. Consequently, as the vehicle starts, with the door closed, the printing mechanism will show an indication 223 of zero miles, an indication 224 giving the net number of passengers then on the vehicle and an indication 225 giving the date and time of departure.

After the vehicle travels a certain distance, it may stop and the door be opened again. This causes the printing mechanism again to operate. It will then show an indication 226 giving the miles traveled; an indication 227 repeating the number of passengers aboard and an indication 228 giving date and new time. This record instantly shows that the vehicle transported fourteen passengers a distance of twenty miles from 8:15 to 8:45 a. m. on April 20, 1936. It makes no difference how many passengers may have boarded and left the vehicle prior to the time it left the station.

At this second station, a certain number of passengers may leave the vehicle and be duly counted off, others may board the vehicle and be counted on. Consequently, when the door is again closed, as the vehicle starts from the second station, the printing mechanism will operate and the indication will show at 229 the same number of miles. The passenger indications 230, however, will show the new net number of passengers aboard the vehicle. It will likewise give an indication 231 of the date and hour of departure from the second station. Later, when the vehicle stops at a third station, there will be recorded a new mileage indication 232, the same passenger indication repeated at 233 and a new date and time 234.

In the modification shown in Fig. 9, the battery is shown again at 10 having a negative terminal 168 and a positive terminal 186 in the same manner as Fig. 1. The positive lines 185 and 189 extend to the several relays shown in Fig. 1 in identically the same manner as therein. In this Fig. 9, the changes embody the substitution of a photoelectric relay for the second step and the use of a relay in place of positioning of the several switches directly on or for direct operation by the first step. The ultimate operation is the same so that the points 182, 194 and 203 comprising the three terminals, put in circuit by the steps of Fig. 1, again appear in Fig. 9 and, as will be shown, are energized in the same way as they are in Fig. 1.

In Fig. 10, the step is shown at 240, it comprising a fixed edge 241 to which is pivoted a swinging tread 242. This tread has a block 243 adapted to operate a switch blade 244 selectively to connect the same to the switch contact 245. The second step is designated 246 and has a riser 247. The light beam for operating the second relay is shown at 248. Of course, the light source is on one side of the steps with the selenium cell on the opposite side so that, as a person ascends the steps, he will break the light beam. This light source 248 is located a distance $a$ above the tread 242 and a distance $b$ in advance of the riser 247 to the second step 246.

The blade 244 of the step-actuated switch is connected to the line 189. The contact 245 connects to a lead 250 extending into a relay coil 251; thence by a line 252 into a negative wire 253 extending to the line 168. Consequently, upon depression of the step, the switch 240 will be closed and the relay 251 energized.

A bell crank lever 254 carries an armature 255 attracted by the coil 251. An actuating bar 256 is operated by the bell crank 254 and is lifted when the armature 255 is drawn toward the coil 251. This bar 256 is attached to a series of resilient switch blades 257, 258 and 259. The resiliency of these blades normally urges the bar 256 downwardly. A fixed blade 260 is normally in contact with the blade 257 and a fixed blade 261 is normally in contact with the blade 258. A fixed blade 262 is normally out of contact with the blade 259, it being understood that the normal position maintains when the bar 256 is down and the coil 251 not energized.

The photo-relay operates a similar switch. When the beam from the light 248 is broken, the resistance through the cell circuit 265 changes and permits current to flow from the main lead 185 through the lead 266, the cell circuit 265, the lead 267, the relay coil 268, the line 269, and the negative line 270 into the negative terminal 168 of the battery. Upon energization of the relay, the bell crank lever 271 is rotated slightly counterclockwise, lifting the bar 272 and correspondingly lifting the resilient switch blades 273, 274 and 275. A fixed blade 276 is normally in contact with the blade 273 and a fixed blade 277 is normally in contact with the blade 274. A fixed blade 278 is normally out of contact with the blade 275.

The door switch and print mechanism are identical with those shown in Fig. 1 and are connected in similar wise into the circuit.

With both relays open, there is a circuit as follows, putting the negative terminal 168 of the battery in circuit with the point 203 operating the trip relays: The negative line 253 extends to the fixed contact 260 closed with the blade 257 from which extends the line 280 to the fixed blade 276 of the other relay through movable blade 273 and line 281 to the point 203.

When the step switch 240 is closed and the photo-relay 265 is open, the circuit is closed in the following manner: From the negative terminal 168 through line 253 to the fixed blade 262, movable blade 259, lead 282, fixed blade 277, movable blade 274 and lead 283 to the point 182.

As the person steps from the step 242 to the step 246, he will break the light from 248. This, then, lifts the bar 272 by energization of the relay 268. At this time, however, nothing will happen, because the step switch is also closed. In passing from the step 242 to the step 246, however, the step will be free from the weight of the passenger before he passes beyond the light beam from 248 so that the relay 268 will remain energized after the relay 251 has been released. With this condition existing, the circuit is closed in the following manner: First, the point 182 is cut out of circuit, since the lifting of the bar 272 parts the contacts 274 and 277, disconnecting the line 283 from the negative terminal of the battery. The point 194, however, is then put in circuit with this negative terminal in the following manner: From the line 270 through a lead 285, the fixed contact 278, movable contact 275, line 286, fixed contact 261 of the step relay, movable contact 258 thereof, line 287 to the point 194. From this point, the sequence of operation is identical with that of Fig. 1.

Of course, it will be understood that, when either the step-relay or the photo-relay is energized, the trip point 203 will be cut out of circuit, since lifting of either the bar 256 or the bar 272 can open this circuit, as is apparent.

The location of the light 248 is, as previously mentioned, such that a person mounting the step 242 will depress the same before breaking the light from 248; but, as this person then moves to the step 246, he will hold the light broken after the step 242 is free. To this end it has been determined that the distance $a$ may be in the order of thirty inches above the step 242. It should be sufficiently above this step so that, if the passenger is carrying baggage, this baggage will not break the light until after the step switch is closed. The light should be in advance of the riser 247 a sufficient distance to insure, however, that it will be broken before the switch 242 is released; since, as soon as both switches are at the same time released, the mechanism is entirely cleared by the trip circuits. Furthermore, the light must be in such position that it will be broken upon descent of the passenger from the step 246 to the step 242 prior to the time the passenger depresses the step 242 to close its relay. To this end, the distance $b$ may be in the order of three inches. These dimensions will necessarily be varied somewhat by the conditions under which the mechanism operates and also by the dimensions of the two steps.

It is desirable also to have the pivoted portion 242 slightly in from the forward edge of the step 240. In the use of mechanisms of this kind, occasionally crowding takes place which, under certain circumstances, could render the mechanism shown in Fig. 1 inaccurate. This crowding does not, under ordinary circumstances, take place on the first step. In other words, there is ordinarily only one passenger at a time on this first step. If an entering passenger should, while another is acutally on the first step, rest his foot on the edge 241, the mechanism would not be effective and, prior to the time the first passenger can clear the first step sufficiently to permit the second passenger to depress the same, the light 248 will be broken and the pivoted portion 242 of the step will be released for sufficient length of time to permit operation of the mechanisms; and also, by the time the first passenger is completely on the step 246, clearing the step 242 for the second passenger, the light beam will be restored, since it is actually over the first step and not the second. Manifestly, it makes no difference what crowding takes place on the step 246, and it is upon this step that such principally occurs. This order could be reversed where it is determined that the principal crowding occurs on the first step.

It does not seem necessary to review in detail the operation of the modification shown in Fig. 9. Suffice it to say that, when the step switch is closed first, the point 182 is energized; and, upon subsequent release of the first step and closing of the relay 268, the point 182 is reenergized and point 194 is energized. Upon subsequent release of both steps, the point 203 of the trip mechanism is energized and all the circuits are broken. When the photo-electric relay is broken first upon descent of a passenger, the point 194 is first energized and, upon subsequent deenergization of the relay 268 and closing of the step switch, the point 194 is deenergized and the point 182 energized. The partial operations described in connection with Fig. 1 operate in the same manner in Fig. 9.

Thus, it will be seen that a mechanism has been provided that overcomes the effects of crowding by means in the form of the fixed edge 241 related to crowding on the first step; and the employment of the light means 248 in place of the movable second step, thereby obviating any effect of crowding on the latter step.

It may thus be seen that this mechanism always indicates the number of miles traveled and the net number of passengers carried between stops. It likewise gives the date and time so that whether the vehicle is adhering to its schedule may be determined. It likewise is not affected by the fact that passengers get on and off the vehicles as it is stopped at a station or partially get on or off as it is stopped. The entire device is automatic and gives a complete check independently of any act of the operator or passengers. If the vehicle should include separate doors for getting on and off, the circuits may be divided to accommodate for this. Such, however, is reserved for further application.

What is claimed is:

1. In a mechanism of the kind described, means to register the number of passengers passing through a door, printing means operably associated with said register to record said number, and means actuated by movement of the door to cause operation of the printing means every time the door is moved as to permit passage of a passenger.

2. In a mechanism of the kind described for recording the number of objects in an enclosure having a door through which an indefinite number of said objects may pass in either direction at any time the same is open, an object registering device including means to register the number of objects passing through the door and to determine therefrom the net number of objects within the enclosure, and means to record said net number of objects as determined by said registering means, said means including a switch operated by movement of the vehicle door, and also including an electrically operated record making device adapted to record the registration effected by the registering means, and a circuit including said door operated switch for the record making device, whereby when the door is operated a record will be made.

3. In a mechanism of the kind described, a counting device, a circuit therefore, a first switch in said circuit operable from initial position to closed position, means to hold said first switch in closed position, means to release said holding means, a second and a third switch each operable from an initial to a second position, means to close the first switch upon actuation of the second switch to second position, the circuit for the counting means being closed thereafter upon movement of the third switch to second position and return of the second switch, and the release means being operable upon return of both the second and third switches.

4. In a mechanism of the kind described, a counting means, a main switch, means to close the main switch, a first and a second operating switch, each operable from an initial to a second position, a circuit through the means to close the main switch, said circuit including the first operating switch in second position, a circuit through the counting means including the main switch in closed position and the second operating switch in second position, and the first operating switch in first position, means to open the main switch, and a circuit therefore including both operating switches in initial position.

5. In a mechanism of the kind described, a counting mechanism, a main switch, a pair of operating switches movable from initial to second position, means to close and latch said main switch, means to release said latching means, a circuit including the closing means, the first operating switch in second position and the second operating switch in first position, and a second circuit including the counting mechanism, the main switch, the first operating switch in first position, the second operating switch in second position, and the release means.

6. In a mechanism of the kind described, a counting mechanism, a main switch, a pair of operating switches movable from initial to second positions, means to close and latch said main switch, means to release said latch, a circuit including the closing means, the first operating switch in second position and the second operating switch in first position, a second circuit including the counting mechanism, the main switch, the first operating switch in first position, the second operating switch in second position, and a third circuit including both operating switches in initial positions and the release means.

7. In a mechanism of the kind described, a first counting mechanism, a second counting mechanism, a pair of main switches, one for each counting mechanism, a first and a second operating switch, each movable from first to second position, means to close each main switch, means to open each main switch, a first circuit through the first operating switch in second position, the second operating switch in first position, the means to close the first main switch and the means to open the second main switch; a second circuit through the first operating switch in first position, the second operating switch in second position, the closed first main switch, the first counting means, and the means to open the first main switch; a third circuit through the second operating switch in second position, the first operating switch in first position, the means to close the second main switch and the means to open the first main switch; and a fourth circuit through the first operating switch in second position, the second operating switch in first position, the closed second main switch, the second counting means, and the means to open the second main switch; the order of operation of the operating switches thereby determining which counting mechanism is actuated.

8. In a mechanism of the kind described, a first counting mechanism, a second counting mechanism, a first main switch, a second main switch, a first and a second operating switch, both operable to first and second positions, means to close each main switch, a first circuit including the first operating switch in second position and the second operating switch in first position, the first main switch closing means, the second main switch and, in series with the second main switch, the second counting mechanism, and a second circuit including the second operating switch in second position and the first operating switch in first position, the second main switch closing means, the first main switch and, in series with the first main switch, the first counting mechanism, means to hold the first main switch closed until closure of the second circuit when the second circuit is operated after the first, and means to hold the second main switch closed until closure of the first circuit when the first circuit is operated after the second, whereby either counting mechanism may be actuated by successive operation of the operating switches and the order of operation of the operating switches will determine which counter will be actuated.

9. A mechanism as in claim 8, together with a means to open each of said main switches, the first circuit including the means to open the second main switch, and the second circuit including means to open the first main switch.

10. In a mechanism of the kind described, a pair of main switches, a pair of actuated means, a pair of operating switches operable to first and second positions, a means to close each main switch, a delayed-action means to open each main switch, a circuit through each main switch, each circuit aforesaid including also one operating switch in first position and the other operating switch in the second position, one of the actuated means, and including the delayed-action opening means, whereby each circuit may be closed a predetermined time and then self-opened to cause operation of the actuated means followed by opening of their circuits.

11. In a mechanism of the kind described, a first and second counting means, a circuit for each, a first and a second main switch, a first and a second main switch closing means, a first and a second circuit opening means, a first and a second operating means, a circuit including the first closing means, the second opening means and the first operating means in actuated position, a circuit including the first counting means, the first main switch and the second operating means in actuated position, whereby when said circuits, being otherwise closed, are energized by actuation of said operating means, said first counting means is caused to operate, a circuit including the second closing means, the first opening means and the second operating means in actuated position, and a circuit including the second counting means, the second main switch and the first operating switch in operated position, whereby when said last two circuits, being otherwise closed, are energized by actuation of said operating means, said second counting means is caused to operate, and said several circuits being opened by the operation aforesaid upon actuation of the opening means.

12. A mechanism as in claim 11, together with circuit clearing means adapted to open both counting circuits upon return of both operating means to initial position.

13. A mechanism as in claim 11, together with self-deenergizing circuit clearing means adapted to open both counting means circuits upon return of both operating means to initial position, said clearing means being electrically operated through circuits adapted to be opened upon opening of the counting means circuits.

ADOLPHUS D. BRANHAM.